US011713986B2

(12) United States Patent
Ming

(10) Patent No.: US 11,713,986 B2
(45) Date of Patent: Aug. 1, 2023

(54) THROTTLING COMPONENT AND CONDITIONING AND FLOWRATE MEASUREMENT DEVICE

(71) Applicant: NANJING EXACTRA AUTOMATION CONTROL TECHNOLOGY CO., LTD., Jiangsu (CN)

(72) Inventor: Xiao Ming, Jiangsu (CN)

(73) Assignee: NANJING EXACTRA AUTOMATION CONTROL TECHNOLOGY CO., LTD., Jiangsu (CN)

(*) Notice: Subject to any disclaimer, the term of this patent is extended or adjusted under 35 U.S.C. 154(b) by 409 days.

(21) Appl. No.: 16/975,300

(22) PCT Filed: Jan. 16, 2019

(86) PCT No.: PCT/CN2019/071962
§ 371 (c)(1),
(2) Date: Aug. 24, 2020

(87) PCT Pub. No.: WO2019/161716
PCT Pub. Date: Aug. 29, 2019

(65) Prior Publication Data
US 2021/0372833 A1 Dec. 2, 2021

(30) Foreign Application Priority Data

Feb. 23, 2018 (CN) .......................... 201810155101.4
Feb. 23, 2018 (CN) .......................... 201810155152.7
Feb. 23, 2018 (CN) .......................... 201810155154.6

(51) Int. Cl.
G01F 1/40 (2006.01)
F15D 1/02 (2006.01)
F16L 55/027 (2006.01)

(52) U.S. Cl.
CPC ............... *G01F 1/40* (2013.01); *F15D 1/025* (2013.01); *F16L 55/02718* (2013.01)

(58) Field of Classification Search
CPC ..... G01F 1/40; G01F 1/42; G01F 1/44; G01F 1/36; F15D 1/025; F16L 55/02718; F16L 55/02754; F16L 55/02763
See application file for complete search history.

(56) References Cited

U.S. PATENT DOCUMENTS 1,648,708 A * 11/1927 Wilkinson ................ G01F 1/40
138/40
3,838,598 A * 10/1974 Tompkins ................ G01F 1/42
73/861.52

(Continued)

FOREIGN PATENT DOCUMENTS

CN 101050973 A 10/2007
CN 101311683 A 11/2008

(Continued)

Primary Examiner — Justin N Olamit
(74) Attorney, Agent, or Firm — Browdy and Neimark, PLLC

(57) ABSTRACT

A throttling component and a conditioning and flowrate measurement device including a throttling component. The throttling component comprises a central throttling element and multiple peripheral throttling elements. The multiple peripheral throttling elements are sequentially sleeved on the exterior of the central throttling element, and are coaxial to the central throttling element; annular fluid channels are respectively formed between the central throttling element and its adjacent peripheral throttling element, and between adjacent peripheral throttling elements. A sensitive and clear differential pressure signal is generated while the throttling component stabilizes the flow, so that the accuracy and reliability of flowrate measurement can be improved.

7 Claims, 11 Drawing Sheets

(56) References Cited

U.S. PATENT DOCUMENTS

| | | | |
|---|---|---|---|
| 5,341,848 A | 8/1994 | Laws | |
| 5,529,093 A | 6/1996 | Gallagher | |
| 7,051,765 B1 | 5/2006 | Kelley | |
| 8,132,961 B1 * | 3/2012 | England | G01F 1/36 |
| | | | 366/340 |
| 9,046,115 B1 * | 6/2015 | England | B01F 25/4335 |
| 9,506,484 B2 * | 11/2016 | Brown | G06F 30/17 |
| 2013/0098485 A1 | 4/2013 | Speldrich | |
| 2014/0338771 A1 | 11/2014 | Brown | |
| 2016/0153602 A1 | 6/2016 | Ahuja et al. | |
| 2017/0086708 A1 * | 3/2017 | Takatori | A61B 5/082 |
| 2017/0292864 A1 * | 10/2017 | Zhang | G01F 1/40 |

FOREIGN PATENT DOCUMENTS

| | | |
|---|---|---|
| CN | 101413626 A | 4/2009 |
| CN | 202018306 U | 10/2011 |
| CN | 102435236 A | 5/2012 |
| CN | 202631016 U | 12/2012 |
| CN | 202748062 U | 2/2013 |
| CN | 103674128 A | 3/2014 |
| CN | 103977919 A | 8/2014 |
| CN | 206990040 U | 2/2018 |
| DE | 102009057418 A1 | 5/2011 |
| KR | 100760065 B1 | 9/2007 |
| WO | 2016029423 A1 | 3/2016 |

* cited by examiner

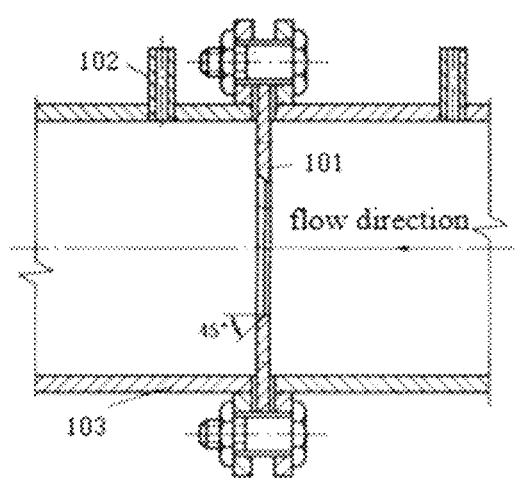
FIG.1
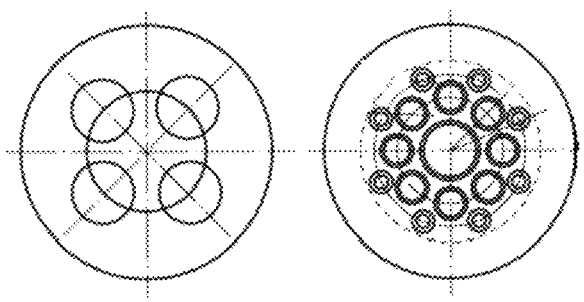
FIG.2a
(PRIOR ART)
FIG.2b
(PRIOR ART)

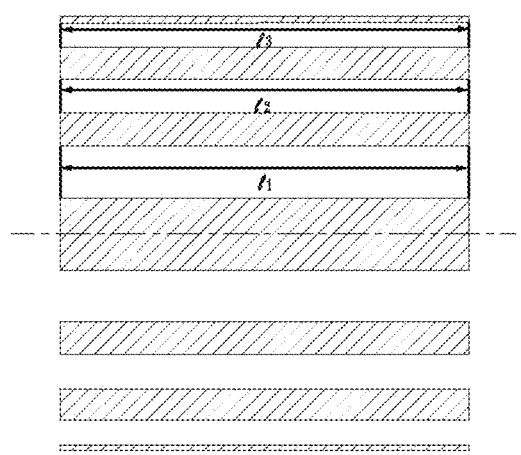
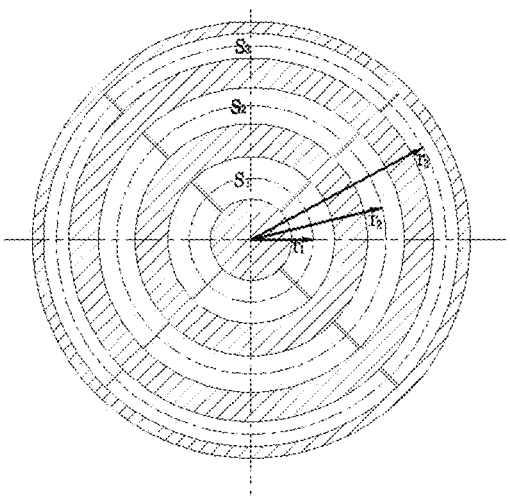
FIG.5a  FIG.5b
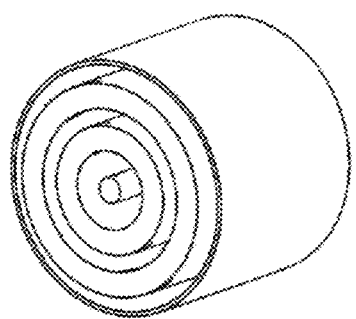
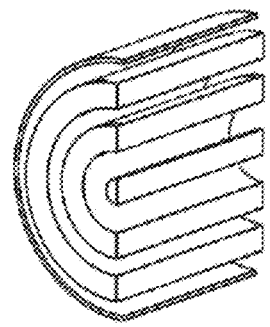
FIG.6a  FIG.6b
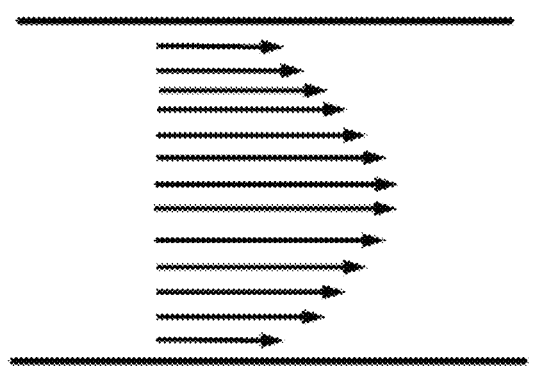
FIG.7

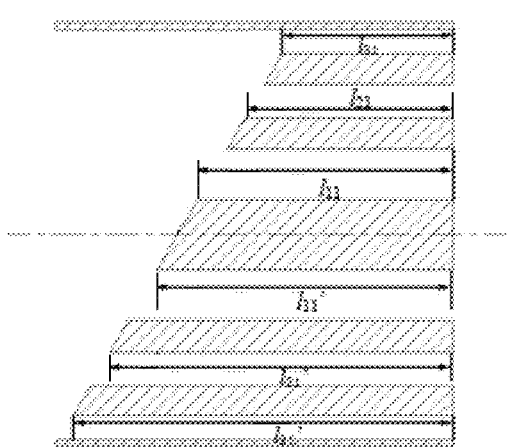
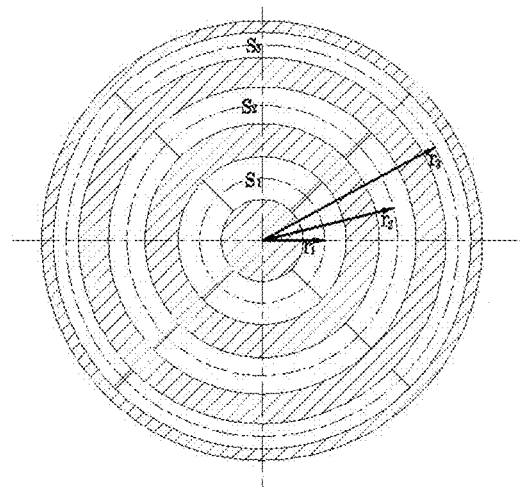
FIG.11a  FIG.11b
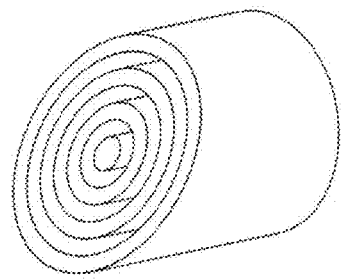
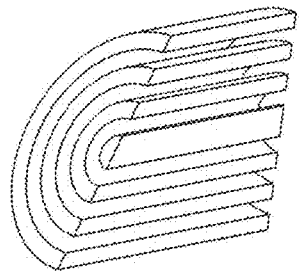
FIG.12a  FIG.12b
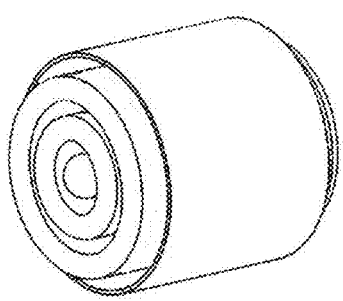
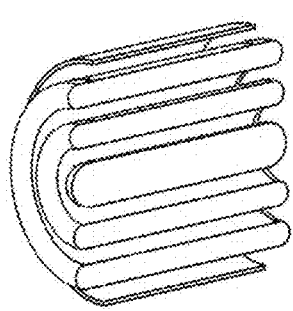
FIG.13a  FIG.13b

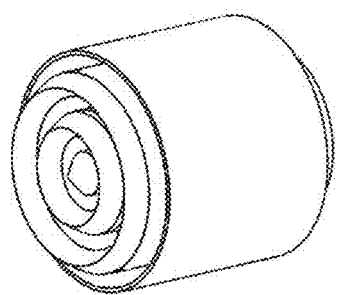
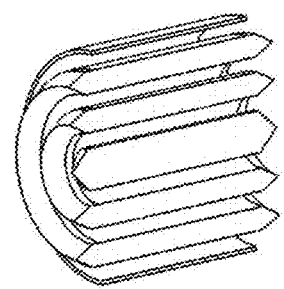
FIG.14a  FIG.14b
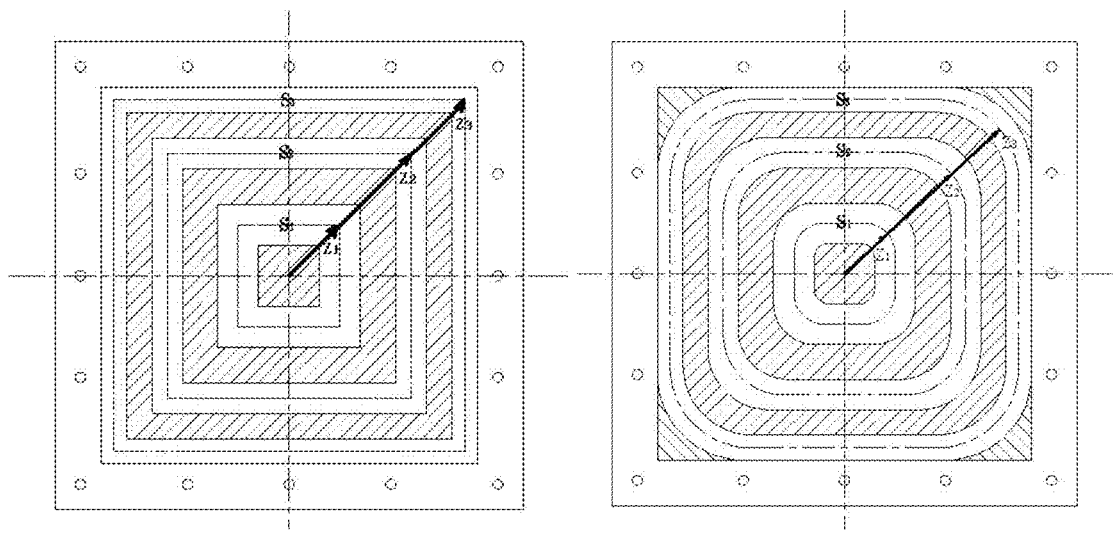
FIG.15  FIG.16
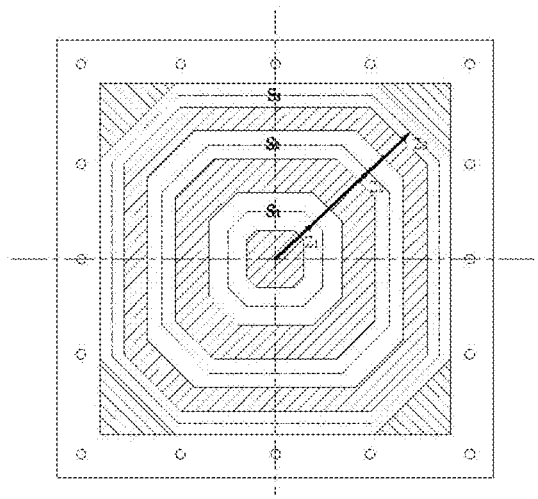
FIG.17

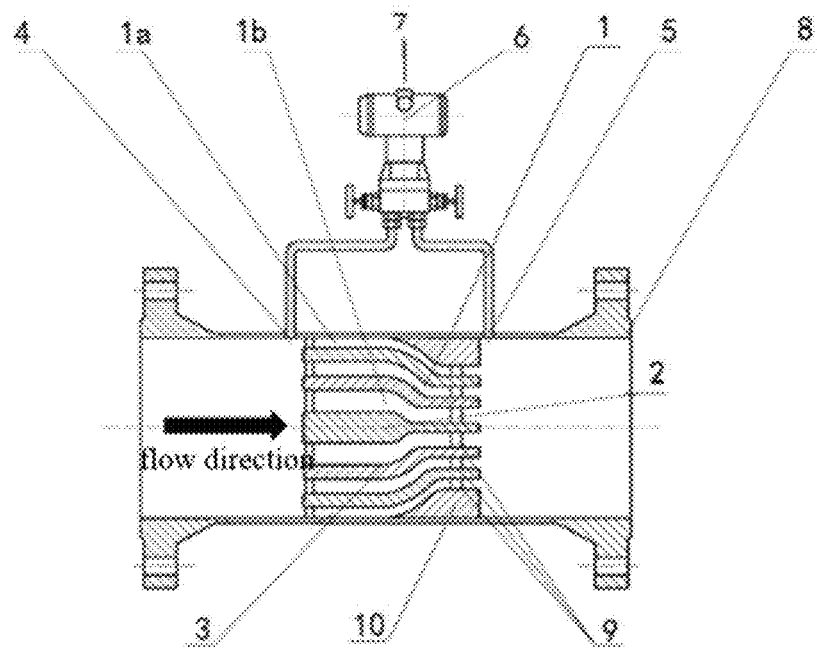
FIG.18
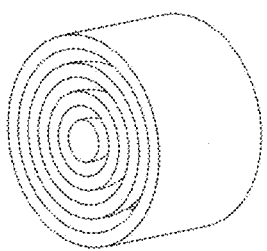 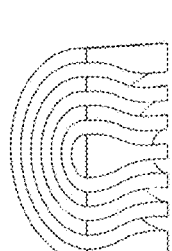  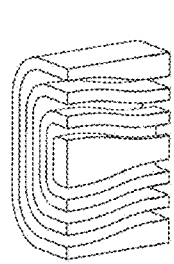
FIG.19   FIG.20   FIG.21   FIG.22

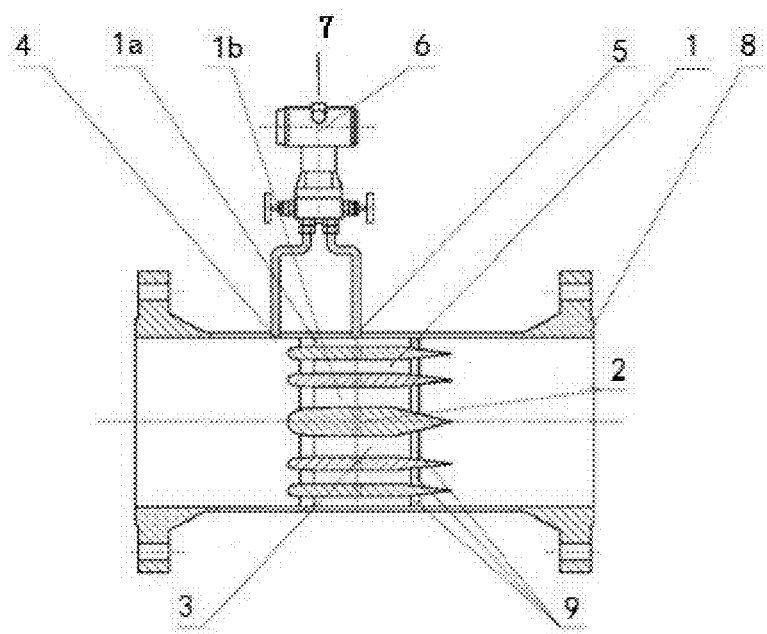
FIG.29
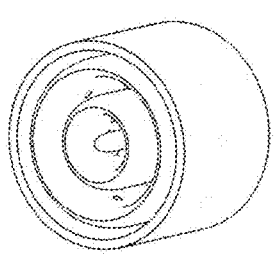 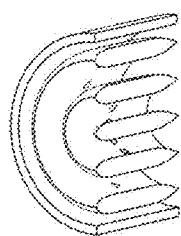 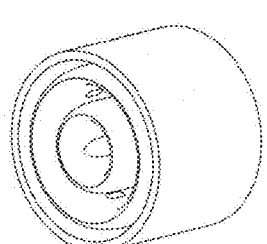 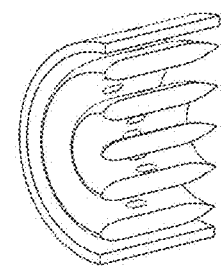
FIG.30  FIG.31  FIG.32  FIG.33

THROTTLING COMPONENT AND CONDITIONING AND FLOWRATE MEASUREMENT DEVICE

TECHNICAL FIELD

The present disclosure relates to the field of flowrate measurement, in particular to a throttling component and a conditioning and flowrate measurement device comprising the throttling component.

BACKGROUND

If a throttling element with a flow area smaller than the cross-sectional area of a pipeline is placed in the pipeline filled with fluid, the fluid beam in the pipeline will generate local contraction or flow separation when passing through the throttling element, and the static pressure will be reduced at the position of contraction or separation, so that certain pressure difference (in other words, differential pressure) can be generated before and after the throttling element. A certain function relationship exists between the pressure difference and the flow, so the flowrate can be measured by measuring the pressure difference before and after the throttling element placed in the pipeline.

Existing flow sensors placed in a pipeline for flowrate measurement by utilizing the pressure difference between the total pressure and the static pressure are most typical of an orifice plate (see FIG. 1), a standard nozzle, a Venturi tube and various uniform-velocity tubes. The orifice plate, the standard nozzle, the Venturi tube and the like cause the pressure difference by the contraction which occurs when the fluid flows through the measuring element; and the uniform-velocity tube mainly causes the pressure difference by the separation which occurs when the fluid flows through the measuring element. In order to overcome the influence of negative factors such as vortex, pulsation and the like caused by various pumps, valves, bends, bypasses and other devices upstream and downstream in a fluid pipeline, relatively long straight pipes before and after the flow sensor are needed in operation so as to ensure that the flow in the pipeline is a standard pipe flow which is fully developed when the flow is measured. The requirements of the upstream and downstream straight pipes greatly limit the application occasions of various flow sensors, and people skilled in the art use various conditioning devices to develop flow in the pipeline to a standard form as soon as possible.

An existing conditioning device is usually composed of one or several elongated channels, and if the number of the channels is controlled, flow contraction or separation can be caused before and after the channels, so that differential pressure can be generated for flowrate measurement; meanwhile, reducing the density of the channels and arranging the channels according to a certain rule is advantageous to reducing mutual influence among the flow separation in the rear part of the channels. Based on such idea, engineering and technical personnel developed throttling devices with porous channels as shown in FIG. 2a and FIG. 2b on the basis of standard flow sensors such as an orifice plate for flow conditioning and flowrate measurement.

U.S. Pat. Nos. 5,341,848 and 5,529,093 both disclose a plate-like conditioning device having a plurality of circular channels and having a certain thickness (i.e., a porous orifice plate). The size, number and position of the circular channels are appropriately arranged according to a certain rule to improve flow stability and to fully develop the flow as soon as possible. U.S. Pat. No. 705,165 and Chinese patent CN200710162844.6 further disclose a balancing orifice plate, which is also a plate-like device having a plurality of through holes arranged according to a certain rule and having a certain thickness. The size, number and position of the through holes in the balancing orifice plate are set according to the requirement of the Reynolds number in each through hole equals to each other so as to balance the flow state, so that the flow is fully developed as soon as possible, and the measuring precision is improved. Chinese patents CN201110344567.7, CN201120087553.7, CN201220273926.4 and so on also disclose orifice plates of a similar structure used for flowrate measurement. Chinese patent CN201220323927.5 discloses a Venturi-shaped orifice plate, wherein each through hole is in a shape of being narrow in the middle and gradually growing enlarged at both ends, namely a Venturi shape. When fluid flows through the orifice plate, due to the fact that the Venturi shape is close to a streamline, turbulence is reduced, so that the requirement of the upstream and downstream straight pipes is reduced, and in turn the pressure signal is more stable, so that the measurement precision is improved. Chinese patent CN201410241286.2 discloses a porous nozzle which adopts one or more sets of standard nozzles symmetrically distributed to achieve the same purpose.

Although these prior arts promote the development of differential pressure flowrate measurement devices, a sensitive and clear differential pressure signal cannot be generated at the same time of stabilizing the flow state, and there is space to be greatly improved.

SUMMARY

The objective of the disclosure is to provide a throttling component and a conditioning and flowrate measurement device comprising the same, so as to generate a sensitive and clear differential pressure signal while stabilizing the flow state, thereby improving the accuracy and reliability of the flowrate measurement.

In one aspect, the disclosure provides a throttling component, comprises a central throttling element and a plurality of peripheral throttling elements, the plurality of peripheral throttling elements are sequentially sleeved outside the central throttling element and are coaxial with the central throttling element; annular fluid channels are respectively formed between the central throttling element and its adjacent peripheral throttling element, and between adjacent peripheral throttling elements.

The other aspect of the disclosure provides a conditioning and flowrate measurement device, comprising:
a measuring pipe;
the throttling component, the throttling component is arranged in the measuring pipe.

The disclosure has the following beneficial effects:

The throttling component is provided with annular fluid channels. Due to the extrusion effect of the annular fluid channels, after entering the annular fluid channels, the flow velocity of the fluid is accelerated, the pressure thereof is reduced, and the distribution of the flow velocity is easily adjusted into a relatively standard form. The velocity distribution of the pipe flow is layered, and the throttling component further adjusts the pipe flow for different layers using the coaxial annular fluid channels, so as to standardize the flow state more quickly (i.e., in a shorter distance).

Due to the fact that the throttling component can rapidly stabilize the fluid flow in the pipeline to be measured and form a regular distribution of flow velocity, it is unnecessary to install the upstream and downstream straight pipes which are required during measurement for existing flowrate measuring devices, and the requirement on site conditions is reduced. When the fluid state in the pipe is adjusted by the annular fluid channels, a pressure drop can be formed to generate a stable differential pressure signal with high signal-to-noise ratio which can be used for flowrate measurement, so that the accuracy and reliability of flowrate measurement are improved.

The conditioning and flowrate measurement device can perform conditioning and flowrate measurement more conveniently and accurately. During operation, the conditioning and flowrate measurement device is in series connection with the pipeline to be measured, and it is unnecessary to install the throttling component in the pipeline to be measured; therefore, coaxiality of each annular fluid channel is ensured and the measurement precision is improved.

BRIEF DESCRIPTION OF THE DRAWINGS

The above and other objectives, features, and advantages of the present disclosure will become more apparent from the following more detailed description of exemplary embodiments of the disclosure taken in conjunction with the accompanying drawings, in which like reference numbers generally represent like parts.

FIG. 1 shows an installation schematic diagram of an existing orifice plate flowmeter;

FIGS. 2a and 2b show schematic diagrams of an existing throttling device with porous channels;

FIGS. 5a and 5b show an axial cross-sectional view and a side cross-sectional view, respectively, of annular fluid channels of a conditioning and flowrate measurement device according to the first embodiment of the present disclosure;

FIGS. 6a and 6b show partial perspective view and partial perspective cross-sectional views, respectively, of a throttling component according to the first embodiment of the present disclosure;

FIG. 7 shows a flow velocity schematic diagram of a conditioning and flowrate measurement device according to a second embodiment of the present disclosure;

FIGS. 11a and 11b show an axial cross-sectional view and a side cross-sectional view, respectively, of annular fluid channels of the conditioning and flowrate measurement device according to the third embodiment of the present disclosure;

FIGS. 12a and 12b show a partial perspective view and a partial perspective cross-sectional view, respectively, of a throttling component according to the third embodiment of the present disclosure;

FIGS. 13a and 13b show perspective and partial perspective views, respectively, of a throttling component according to a fourth embodiment of the present disclosure;

FIGS. 14a and 14b show perspective and partial perspective views, respectively, of a throttling component according to a fifth embodiment of the present disclosure;

FIG. 15 shows a cross-sectional view of a conditioning and flowrate measurement device according to a sixth embodiment of the present disclosure;

FIG. 16 shows a cross-sectional view of a conditioning and flowrate measurement device according to a seventh embodiment of the present disclosure;

FIG. 17 shows a cross-sectional view of a conditioning and flowrate measurement device according to an eighth embodiment of the present disclosure;

FIG. 18 shows a cross-sectional view of a throttling component and a conditioning and flowrate measurement device according to a ninth embodiment of the present disclosure;

FIGS. 19 and 20 show perspective and cross-sectional views, respectively, of a throttling component according to the ninth embodiment of the present disclosure;

FIGS. 21 and 22 show perspective and cross-sectional views, respectively, of a throttling component according to a tenth embodiment of the present disclosure;

FIG. 29 shows a cross-sectional view of a conditioning and flowrate measurement device according to a thirteenth embodiment of the present disclosure;

FIGS. 30 and 31 show perspective and cross-sectional views, respectively, of a throttling component according to the thirteenth embodiment of the present disclosure;

FIGS. 32 and 33 show perspective and cross-sectional views, respectively, of a throttling component according to a fourteenth embodiment of the present disclosure;

Figure 3:
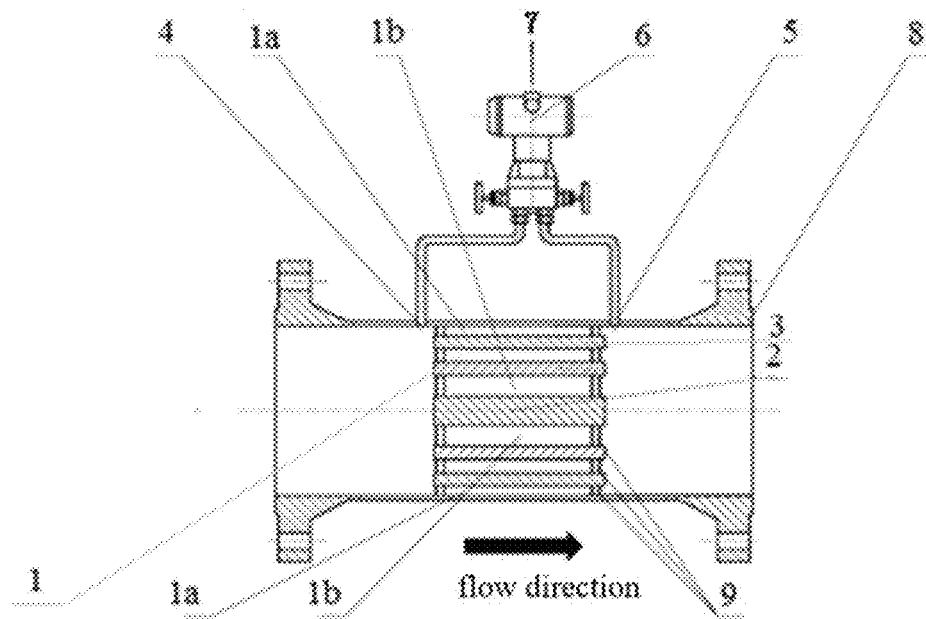
FIG. 3 shows a cross-sectional view of a throttling component and a conditioning and flowrate measurement device according to a first embodiment of the present disclosure.

DESCRIPTION OF REFERENCE NUMBERS 101 orifice plate, 102 measuring nozzle, 103 steel pipe;
1 annular fluid channel, 1a annular fluid channel, 1b annular fluid channel, 2 central throttling element, 3 peripheral throttling element, 4 high-pressure tapping hole, 5 low-pressure tapping hole, 6 differential pressure transmitter, 7 computer, 8 measuring pipe, 9 supporting member, 10 annular protrusion, 11 through hole.

DETAILED DESCRIPTION

The disclosure will be described in more detail below with reference to the accompanying drawings. While preferred embodiments of the disclosure are shown in the drawings, it is to be understood that the disclosure may be embodied in various forms and should not be limited by the embodiments set forth herein. Rather, these embodiments are provided so that this disclosure will be thorough and complete, and will fully convey the scope of the disclosure to those skilled in the art.

The throttling component according to the embodiment of the disclosure comprises a central throttling element and a plurality of peripheral throttling elements, wherein the plurality of peripheral throttling elements are sequentially sleeved outside the central throttling element and coaxial with the central throttling element; annular fluid channels are respectively formed between the central throttling element and its adjacent peripheral throttling element, and between adjacent peripheral throttling elements.

When in use, the throttling component can be arranged in the pipeline to be measured, the central throttling element, the plurality of peripheral throttling elements and the pipeline to be measured are coaxially arranged, an annular fluid channel is also formed between the pipeline to be measured and its adjacent peripheral throttling element, and the side wall of the pipeline to be measured is provided with a high-pressure tapping hole and a low-pressure tapping hole.

When the flow of the pipeline to be measured is measured, the ideal state is the flow state in the pipeline is fully developed pipe flow. Therefore, in the actual industrial process control or trade settlement, there is strict requirement for the straight pipe sections which are arranged in front of and after the flowmeter during installation thereof, to ensure that the pipe flow is fully developed and to ensure the measurement accuracy and reliability. In practice, however, the arrangement of straight pipe sections cannot be guaranteed due to the limitation of on-site conditions, so that various conditioning devices have been invented. In addition, when the flow meter is designed, better conditioning capability is also expected to improve the flowrate measurement accuracy and reliability.

When the throttling component according to the embodiment of the present disclosure is installed in a pipeline to be measured, a plurality of coaxial annular fluid channels are formed by the pipeline to be measured, the central throttling element and the peripheral throttling elements which are coaxially arranged. Due to the extrusion effect of the annular fluid channels, after entering the annular fluid channels, the flow velocity of the fluid is accelerated, the pressure thereof is reduced, and the distribution of the flow velocity is easily adjusted into a relatively standard form. The velocity distribution of the pipe flow is in a lamination state, and the throttling component further adjusts the pipe flow for difference laminas using the coaxial annular fluid channels, so as to standardize the flow state more quickly (i.e., in a shorter distance).

Due to the fact that the throttling component can rapidly stabilize the fluid flow in the pipeline to be measured and form a regular distribution of flow velocity, it is unnecessary to install upstream and downstream straight pipe sections which are required during measurement for existing flowrate measuring devices, and the requirement on site conditions is reduced. When the fluid state in the pipe is adjusted by the annular fluid channels, a pressure drop can be formed to generate a differential pressure signal which can be used for flowrate measurement. During measurement, the pressure difference is measured through the high-pressure tapping hole and the low-pressure tapping hole arranged on the side wall of the pipeline to be measured, and the pressure difference is measured by a pressure sensor or a differential pressure sensor, so that the flow of the pipeline to be measured can be calculated. Due to the fact that the conditioning effect of the throttling component is good, a stable differential pressure signal with high signal-to-noise ratio can be obtained, so that the accuracy and reliability of flowrate measurement are improved.

Another aspect of the present disclosure provides a conditioning and flowrate measurement device, comprising: a measuring pipe; the throttling component, wherein the throttling component is arranged in the measuring pipe.

The conditioning and flowrate measurement device can more conveniently and accurately perform conditioning and flowrate measurement. During use, the conditioning and flowrate measurement device is connected in series with the pipeline to be measured, installation of the throttling component in the pipeline to be measured is not needed, coaxiality of each annular fluid channel is ensured, and the measurement precision is improved.

In order to make the above objectives, features and advantages of the present disclosure more comprehensible, specific embodiments of the disclosure are described in detail below with reference to the accompanying drawings. When the embodiments of the present disclosure are described in detail, for ease of illustration, the example diagrams may not be locally amplified in a general proportion, and the schematic diagrams are merely examples, and are not intended to limit the scope of the disclosure. In addition, the three-dimensional space size of the length, the width and the depth can be included in actual manufacturing.

Embodiment 1

Figure 4:
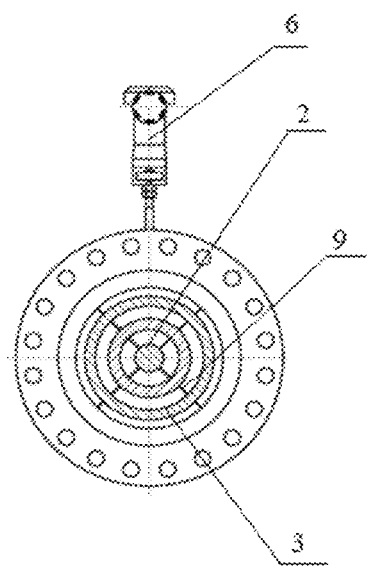
FIG. 4 shows a side view of a throttling component and a conditioning and flowrate measurement device according to the first embodiment of the present disclosure.

FIG. 3 shows a cross-sectional view of a throttling component and a conditioning and flowrate measurement device according to a first embodiment of the present disclosure; FIG. 4 shows a side view of a throttling component and a conditioning and flowrate measurement device according to the first embodiment of the present disclosure; FIGS. 5a and 5b show an axial cross-sectional view and a side cross-sectional view, respectively, of annular fluid channels of a conditioning and flowrate measurement device according to the first embodiment of the present disclosure; FIGS. 6a and 6b show partial perspective view and partial perspective cross-sectional views, respectively, of a throttling component according to the first embodiment of the present disclosure.

As shown in the figures above, the throttling component according to the first embodiment of the present disclosure comprises a central throttling element 2 and a plurality of peripheral throttling elements 3. The plurality of peripheral throttling elements 3 are sequentially sleeved outside the central throttling element 2 and coaxial with the central throttling element 2, annular fluid channels 1 are respectively formed between the central throttling element 2 and its adjacent peripheral throttling element 3, and between adjacent peripheral throttling elements 3.

Wherein, the central throttling element 2 is in a round column shape and comprises an annular side wall and two circular end surfaces connected with the annular side wall. The peripheral throttling element 3 is cylindrical, and the side wall of the peripheral throttling element 3 has a certain thickness. The cross section of the annular fluid channel 1 between the central throttle element 2 and its adjacent peripheral throttling element 3 is a circular ring, and the cross section of the annular fluid channel between adjacent peripheral throttling elements 3 is also a circular ring.

In the present embodiment, the axial lengths of the central throttle element 2 and the plurality of peripheral throttling elements 3 are equal, and the axial end surfaces of the central throttle element 2 and the plurality of peripheral throttling elements 3 are aligned with each other. When the throttling component is applied to a long straight pipeline and the inner wall of the pipeline is relatively smooth, the flow velocity in each annular fluid channel is basically equal. In order to simplify the design, manufacture and installation of the throttling component, the axial lengths of the central throttling element 2 and the plurality of peripheral throttling elements 3 are equal, and the axial end surfaces are aligned with each other, so that a better conditioning effect can be achieved.

In the present embodiment, the area of the cross section of the annular fluid channel satisfies the following formula (1), wherein the cross section is perpendicular to the axial direction of the central throttling element:

$$\frac{S_1 l_1 v_1}{r_1} = \frac{S_2 l_2 v_2}{r_2} = \cdots = \frac{S_i l_i v_i}{r_i} = \cdots = \frac{S_N l_N v_N}{r_N} \qquad (1)$$

wherein, i=1, . . . , N, N is the number of annular fluid channels;
$S_i$ is the area of the cross section of the i-th annular fluid channel;
$l_i$ is the axial length of the i-th annular fluid channel;
$v_i$ is the flow velocity in the i-th annular fluid channel;
$r_i$ is the radius of the central circle of the i-th annular fluid channel.

Through numerical simulation of computational fluid Dynamics (CFD) and experimental measurement of experimental fluid Dynamics (EFD), when the area of the cross section of the annular fluid channel meets the formula (1), the throttling component has the optimal conditioning effect, and the corresponding flowrate measurement precision is the highest.

When the throttling component is arranged in the pipeline to be measured, the area of the cross section of all the annular fluid channels (including the annular fluid channel between the central throttling element and its adjacent peripheral throttling element, the annular fluid channel between the adjacent peripheral throttling elements and the annular fluid channel between the pipeline to be measured and its adjacent peripheral throttling element) satisfies the formula (1).

During actual use, the flow velocity in each annular fluid channel 1 can be determined according to actual working conditions, for example, when the throttling component is applied to a long straight pipeline and the inner wall of the pipeline is relatively smooth, the flow velocity in each annular fluid channel 1 is basically equal; when it is applied to a long straight pipeline but the inner wall of the pipeline has a relatively high roughness, the flow velocity in annular fluid channels 1 near the center of the measuring pipe is relatively high.

After determining the relationship of flow velocities in each annular fluid channel 1 according to the actual working condition, the diameter of the central throttling element 2, the central circle diameter and thickness of each peripheral throttling element 3, the distance between the elements, the lengths of the central throttling element 2 and the peripheral throttling elements 3 can be adjusted under the constraint of the formula (1), so that the optimal conditioning effect is achieved, and the highest measurement precision is obtained.

For example, when the throttling component is applied to a long straight pipe and the inner wall of the pipeline is relatively smooth, in order to simplify the design, manufacture and installation of the throttling component, in this case, the axial lengths of the central throttling element and the plurality of peripheral throttling elements are set equal, that is, $l_1 = l_2 = \ldots = l_i = \ldots = l_N$. In this case, the formula (1) is simplified to the following formula (1-2), i.e. the area of the cross section of the annular fluid channel should be proportional to the radius of its central circle:

$$\frac{S_1 v_1}{r_1} = \frac{S_2 v_2}{r_2} = \cdots = \frac{S_i v_i}{r_i} = \cdots = \frac{S_N v_N}{r_N} \qquad (1\text{-}2)$$

On the other hand, the conditioning and flowrate measurement device according to the embodiment comprises a measuring pipe 8 and a throttling component arranged in the measuring pipe 8. The measuring pipe 8 is cylindrical and is coaxially arranged with the central throttling element 2 and the plurality of peripheral throttling elements 3, and an annular fluid passage 1 is also formed between the measuring pipe 8 and its adjacent peripheral throttling element 3, wherein the annular fluid channel 1a is closest to the side wall of the measuring pipe 8, and the annular fluid channel 1b is closest to the axis of the measuring pipe 8.

The area of the cross section of all the annular fluid channels (including the annular fluid channel between the central throttling element 2 and its adjacent peripheral throttling element 3, the annular fluid channels between the adjacent peripheral throttling elements 3, and the annular fluid channel between the measuring pipe 8 and its adjacent peripheral throttling element 3) satisfies the formula (1).

Each annular fluid channel is internally provided with a supporting and connecting member 9, and the supporting and connecting member 9 can be a supporting rod or a supporting sheet. The supporting and connecting member 9 can support and connect the central throttling element 2 and its adjacent peripheral throttling element 3, the adjacent peripheral throttling elements 3, and the measuring pipe 8 and the peripheral throttling element 3 adjacent thereto, so as to keep the relative position between the elements to be fixed. Preferably, the supporting and connecting members 9 are uniformly distributed in the annular fluid channels relative to the axis of the measuring pipe 8.

On the side wall of the measuring pipe 8, a high-pressure tapping hole 4 is provided close to the inlet end of the throttling component, and a low-pressure tapping hole 5 is provided close to the outlet end of the throttling component. One end of a high-pressure pressure tube is connected to the high-pressure tapping hole 4, and the other end of the high-pressure pressure tube is connected to a high-pressure port of a differential pressure transmitter 6; one end of the low-pressure pressure tube is connected to the low-pressure tapping hole 5 and the other end of the low-pressure pressure tube is connected to a low-pressure port of the differential pressure transmitter 6. The differential pressure transmitter 6 is connected to a computer 7

When in use, the conditioning and flowrate measurement device is connected in series with the pipeline to be measured; when the fluid flows from the pipeline to be measured to the device, a higher pressure is generated at the inlet end of the throttling component due to the blocking effect of the throttling component, and the higher pressure is transmitted to the high-pressure port of the differential pressure transmitter through the high-pressure tapping hole arranged on the side wall of the measuring pipe and the pressure tube; due to the blocking effect of the throttling component, the fluid can only pass through the annular fluid channels, and the fluid is accelerated by the extrusion effect of the annular fluid channels; after the fluid flows out of the annular fluid channels, a lower pressure is generated at the outlet end of the throttling component, and the lower pressure is transmitted to the low-pressure port of the differential pressure transmitter through the low-pressure tapping hole arranged on the side wall of the measuring pipe and the pressure tube; and the differential pressure transmitter transmits the higher pressure signal and the lower pressure signal to the computer, and the computer calculates the corresponding flow according to formulas (5) or (6).

$$q_v = a\varepsilon \cdot \frac{\pi d^2}{4} \sqrt{\frac{2\Delta P}{\rho}} \quad (5)$$

$$q_m = a\varepsilon \cdot \frac{\pi d^2}{4} \sqrt{2\Delta P \rho} \quad (6)$$

wherein:
$q_v$ is volume flow;
$q_m$ is mass flow;
α is a flow coefficient and is determined through calibration of experimental data;
ε is a compressible factor, when the fluid is in a non-compressible state, ε=1; when the fluid is in a compressible state, the value of E is obtained by calibrating experimental data;
d is the equivalent diameter of a standard annular fluid channel, $$d = 2\sqrt{\frac{\Sigma S_i}{\pi}};$$

ρ is the density of the measured medium;
$^\Delta$P is the differential pressure.

In the embodiment, both ends of the measuring pipe 8 are respectively provided with a connecting flange, and the measuring pipe can be connected with the pipeline to be measured through the connecting flanges.

The conditioning and flowrate measurement device can more conveniently and accurately perform conditioning and flowrate measurement. During use, the conditioning and flowrate measurement device is connected in series with the pipeline to be measured, so installation of the throttling component in the pipeline to be measured is not needed, coaxiality of each annular fluid channel is ensured, and the measurement precision is improved.

Embodiment 2

Figures 8A, 8B:
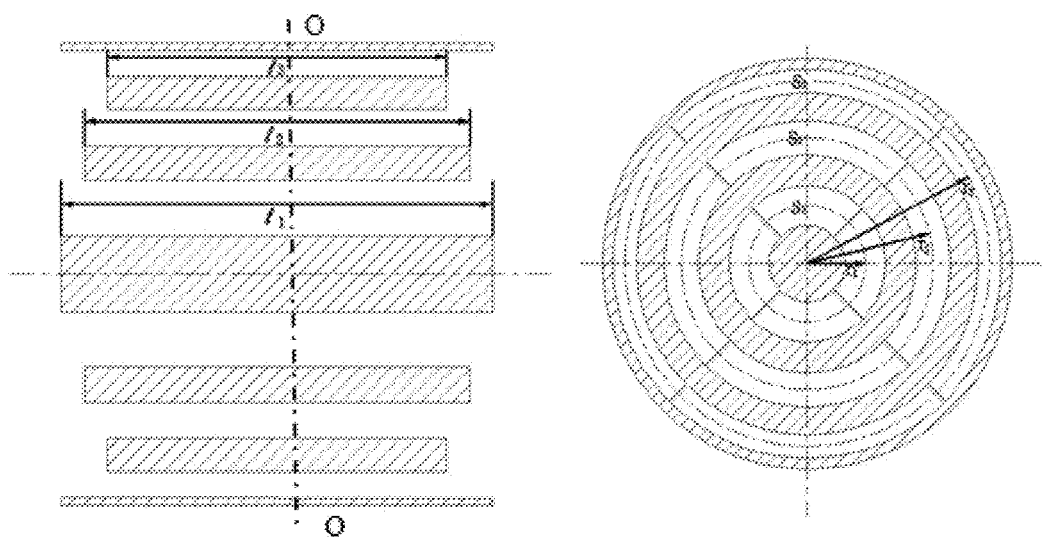
FIGS. 8a and 8b show an axial cross-sectional view and a side cross-sectional view, respectively, of annular fluid channels of the conditioning and flowrate measurement device according to the second embodiment of the present disclosure.
Figures 9A, 9B:
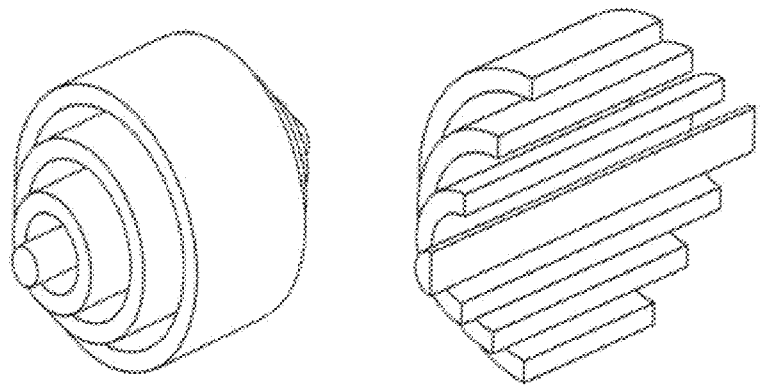
FIGS. 9a and 9b show a partial perspective view and a partial perspective cross-sectional view, respectively, of a throttling component according to the second embodiment of the present disclosure.

FIG. 7 shows a flow velocity schematic diagram of a conditioning and flowrate measurement device according to a second embodiment of the present disclosure; FIGS. 8a and 8b show an axial cross-sectional view and a side cross-sectional view, respectively, of annular fluid channels of a conditioning and flowrate measurement device according to the second embodiment of the present disclosure; and FIGS. 9a and 9b show a partial perspective view and a partial perspective cross-sectional view, respectively, of a throttling component according to the second embodiment of the present disclosure.

When the conditioning and flowrate measurement device is applied to a long straight pipeline and the roughness of the inner wall of the pipeline is relatively high, the flow velocity in the annular fluid channels near the central axis of the measuring pipe is relatively high, and the flow velocity in the annular fluid channels close to the side wall of the measuring pipe is relatively low. FIG. 7 schematically shows the flow velocity distribution under such condition. The conditioning and flowrate measurement device according to the second embodiment is suitable for flowrate measurement in this case.

As shown in the figures above, the second embodiment differs from the first embodiment in that the axial lengths of the central throttling element and the plurality of peripheral throttling elements are sequentially reduced along the radially outward direction of the central throttling element, and the axially central plane O-O of the central throttling element and the plurality of peripheral throttling elements are mutually overlapped, so that the central throttling element and each peripheral throttling element are arranged in a stepped staggered mode at the inlet end and the outlet end of the throttling component. In this way, the length of each annular fluid channel can be roughly corresponding to the flow velocity therein, so that a better conditioning effect can be obtained.

In this case, when, $r_1 < r_2 < \ldots < r_i < \ldots < r_N$, $l_1 > l_2 > \ldots > l_i > \ldots > l_N$, wherein i=1 ... N, N is the number of annular fluid channels; $l_i$ is the axial length of the i-th annular fluid channel; $r_i$ is the radius of the central circle of the i-th annular fluid channel. In this case, the axial length $l_i$ of the annular fluid channel in formula (1) is determined by the axial length of its inside element, as shown in FIG. 8a.

Embodiment 3

Figure 10:
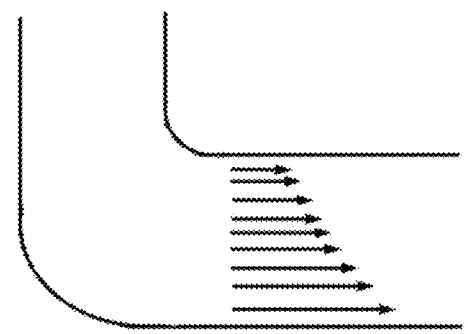
FIG. 10 shows a flow velocity schematic diagram of a conditioning and flowrate measurement device according to a third embodiment of the present disclosure.

FIG. 10 shows a flow velocity schematic diagram of a conditioning and flowrate measurement device according to a third embodiment of the present disclosure; FIGS. 11a and 11b show an axial cross-sectional view and a side cross-sectional view, respectively, of annular fluid channels of a conditioning and flowrate measurement device according to the third embodiment of the present disclosure; and FIGS. 12a and 12b show a partial perspective view and a partial perspective cross-sectional view, respectively, of a throttling component according to the third embodiment of the present disclosure.

When a bend, a tee joint or other devices are installed in front of the conditioning and flowrate measurement device, the flow velocity can change gradiently in the cross section of the pipeline to be measured, that is, the flow velocity near the inner corner of the bend is higher, and the flow velocity close to the outer corner of the bend is lower. The flow velocity distribution in this case is shown schematically in FIG. 10. The conditioning and flowrate measurement device according to the third embodiment is suitable for flowrate measurement in this case.

As shown in the figures above, the third embodiment differs from the first embodiment in that axial end surfaces of the central throttling element and the plurality of peripheral throttling elements at one end are aligned with each other and are perpendicular to the axial direction of the central throttling element, the axial end surfaces of the central throttling element and the plurality of peripheral throttling elements at the other end are located in the same plane and form an included angle less than 90° with the axial direction of the central throttling element. In practice, the included angle is determined according to the distribution of the flow velocity in the bend, so that the arrangement of the inlet end of the formed annular fluid channels corresponds to the distribution of the flow velocity, and a better conditioning effect can be obtained.

In this case, the axial lengths of the annular fluid channels are constantly changing along the circumferential direction of the throttling component, as shown in FIG. 11a. When the formula (1) is applied, the average value of the maximum axial length and the minimum axial length is taken as the axial length of the annular fluid channel, as shown in FIG. 11a, the axis length of each annular fluid channel is determined according to the following formula:

$$l_1=(l_{11}+l_{12}')/2, l_2=(l_{21}+l_{21}')/2, l_3=(l_{31}+l_{31}')/2.$$

Embodiment 4

FIGS. 13a and 13b show perspective and partial perspective views, respectively, of a throttling component according to a fourth embodiment of the present disclosure. The fourth embodiment differs from the first embodiment in that the edges of the axial end surfaces of the central throttling element and the peripheral throttling elements are rounded so that the fluid flows more smoothly through the annular fluid channels.

Embodiment 5

FIGS. 14a and 14b show perspective and partial perspective views, respectively, of a throttling component according to a fifth embodiment of the present disclosure. The fifth embodiment differs from the first embodiment in that the edges of the axial end surfaces of the central throttling element and the peripheral throttling elements are chamfered, so that the fluid flows more smoothly through the annular fluid channels.

Embodiment 6

FIG. 15 shows a cross-sectional view of a conditioning and flowrate measurement device according to a sixth embodiment of the present disclosure. The sixth embodiment differs from the first embodiment in that the cross section of the measuring pipe is in a shape of two concentric rectangles along the direction perpendicular to the axial direction of the central throttling element. Accordingly, the cross section of the central throttling element is rectangular, and the cross section of the peripheral throttling element is in a shape of two concentric rectangles. The area of the cross section of the annular fluid channel formed by the measuring pipe, the peripheral throttling elements and the central throttling element satisfies the following formula (2), wherein the cross section is perpendicular to the axial direction of the central throttling element, and in this case, when the formula (2) is applied, the value of $Z_i$ is determined according to what is shown in FIG. 15:

$$\frac{S_1 l_1 v_1}{z_1} = \frac{S_2 l_2 v_2}{z_2} = \cdots = \frac{S_i l_i v_i}{z_i} = \cdots = \frac{S_N l_N v_N}{z_N} \quad (2)$$

wherein, i=1, . . . , N, N is the number of annular fluid channels;

$S_i$ is the area of the cross section of the i-th annular fluid channel;

$l_i$ is the axial length of the i-th annular fluid channel;

$v_i$ is the flow velocity in the i-th annular fluid channel;

$z_i$ is half of the diagonal length of the central rectangle of the i-th annular fluid channel.

The central rectangle of the annular fluid channel is the rectangle in the middle of the inner circumference and outer circumference of the annular fluid channel, the distance between the periphery of central rectangle and the outer circumference and that between the periphery of central rectangle and the inner circumference are equal with each other.

Embodiment 7

FIG. 16 shows a cross-sectional view of a conditioning and flowrate measurement device according to a seventh embodiment of the present disclosure. The seventh embodiment differs from the sixth embodiment in that the central throttling element and the peripheral throttling elements are subjected to rounded corner treatment, so that the cross section of the annular fluid channel is in a shape of two concentric rectangles with round corners. In this case, when the formula (2) is applied, the value of $Z_i$ can be appropriately corrected, for example, the value of $Z_i$ is determined as shown in FIG. 16, so that the calculation precision is improved.

Embodiment 8

FIG. 17 shows a cross-sectional view of a conditioning and flowrate measurement device according to an eighth embodiment of the present disclosure. The eighth embodiment differs from the sixth embodiment in that the central throttling element and the peripheral throttling elements are chamfered, so that the cross section of the annular fluid channels is in a shape of two concentric chamfered rectangle. In this case, when the formula (2) is applied, the value of $Z_i$ can be appropriately corrected, for example, the value of $Z_i$ is determined as shown in FIG. 17, so that the calculation precision is improved.

Embodiment 9

FIG. 18 shows a cross-sectional view of a throttling component and a conditioning and flowrate measurement device according to a ninth embodiment of the present disclosure; and FIGS. 19 and 20 show perspective and cross-sectional views, respectively, of a throttling component according to the ninth embodiment of the present disclosure.

As shown in FIGS. 18-20, the throttling component according to the present embodiment comprises a central throttling element 2 and a plurality of peripheral throttling elements 3, wherein the plurality of peripheral throttling elements 3 are sequentially sleeved outside the central throttling element 2, and are coaxial with the central throttling element 2; annular fluid channels 1 are respectively formed between the central throttling element 2 and its adjacent peripheral throttling element 3, and between adjacent peripheral throttling elements 3. The annular fluid channel sequentially comprises an inlet contraction portion and a portion with uniform cross section along the axial direction of the central throttling element 2.

The annular fluid channel 1 comprises an inlet contraction portion and a portion with uniform cross section which are communicated with each other. In the inlet contraction portion, the area of the cross section of the annular fluid channel is gradually reduced along the axial direction of the central throttling element (i.e., the fluid flow direction after the throttling component is installed in the pipeline to be measured), and in the portion with uniform cross section, the area of the cross section of the annular fluid channel is kept constant. When the fluid flows through the throttling element, the pressure is maximized in front of the inlet contraction portion, and the pressure reduces to the minimum in the portion with uniform cross section, which can form a pressure drop to generate a differential pressure signal used for flowrate measurement. During measurement, on the side wall of the pipeline to be measured, a high-pressure tapping hole is formed close to the inlet port of the throttling component, and a low-pressure tapping hole is formed close to the outlet port of the throttling component; pressure is taken through the high-pressure tapping hole and the low-pressure tapping hole, and the pressure difference is measured by a pressure sensor or a differential pressure sensor, so that the flow of the pipeline to be measured can be calculated. Due to the fact that the conditioning effect of the throttling component is good, a stable differential pressure signal with high signal-to-noise ratio can be obtained, so that the accuracy and reliability of flowrate measurement are improved.

As shown in FIG. 18, the central throttling element 2 is in a column shape and comprises a first portion and a second portion which are connected; the diameter of the first portion of the central throttling element 2 is gradually reduced along the axial direction thereof, and the second portion of the central throttling element 2 is in a round column shape with uniform diameter; the peripheral throttling element 3 is funnel-shaped and comprises a first portion and a second portion which are connected, the diameter of the first section of the peripheral throttling element 3 is gradually reduced along the axial direction thereof, and the second portion of the peripheral throttling element 3 is a cylinder with uniform diameter. Annular fluid channels including an inlet constriction portion and a portion with uniform cross section can be formed by the central throttling element and the peripheral throttling elements having the shapes described above. In this case, when the throttling component is arranged in the pipeline to be measured, an annular protrusion 10 is arranged on the inner wall of the pipeline to be measured in advance, so that an annular fluid channel comprising an inlet contraction portion and a portion with uniform cross section is formed between the pipeline to be measured and its adjacent peripheral throttling element. The axial cross section of the annular protrusion 10 can be a curved-edge trapezoid.

In the present embodiment, the axial lengths of the central throttle element 2 and the plurality of peripheral throttling elements 3 are equal, and the axial end surfaces thereof are aligned with each other to facilitate the formation of an inlet contraction portion and the portion with uniform cross section.

Each annular fluid channel 1 is internally provided with a supporting and connecting member 9, and the supporting and connecting member 9 plays a fixing and supporting effect on the central throttling element 2 and the peripheral supporting elements 3.

In the present embodiment, the area of the cross section of the annular fluid channel (including the annular fluid channel between the central throttling element and its adjacent peripheral throttling element, the annular fluid channel between the adjacent peripheral throttling elements, and the annular fluid channel between the pipeline to be measured and its adjacent peripheral throttling element) satisfies the following formula (3), wherein the cross section is perpendicular to the axial direction of the central throttling element:

$$\frac{S_1 l_1 v_1}{r_1} = \frac{S_2 l_2 v_2}{r_2} = \cdots = \frac{S_i l_i v_i}{r_i} = \cdots = \frac{S_N l_N v_N}{r_N} \qquad (3)$$

wherein, i=1, . . . , N, N is the number of annular fluid channels;
$S_i$ is the area of the cross section of the portion with uniform cross section of the i-th annular fluid channel;
$l_i$ is the axial length of the i-th annular fluid channel;
$v_i$ is the flow velocity in the portion with uniform cross section in the i-th annular fluid channel;
$r_i$ is the radius of the central circle of the portion with uniform cross section of the i-th annular fluid channel.

Through numerical simulation of computational fluid dynamics (CFD) and experimental measurement of experimental fluid dynamics (EFD), when the area of the cross section of the annular fluid channel meets the formula (3), the throttling component has the optimal conditioning effect, and the corresponding flowrate measurement precision is the highest.

During actual use, the flow velocity in each annular fluid channel 1 can be determined according to actual working conditions, for example, when the throttling component is applied to a long straight pipeline and the inner wall of the pipeline is relatively smooth, the flow velocity in each annular fluid channel 1 is basically equal; when it is applied to a long straight pipeline but the inner wall of the pipeline has a relatively high roughness, the flow velocity in annular fluid channels 1 near the center of the measuring pipe is relatively high.

After determining the relationship of flow velocities in each annular fluid channel 1 according to the actual working condition, the diameter of the central throttling element 2, the central circle diameter and thickness of each peripheral throttling element 3, the distance between the elements, the lengths of the central throttling element 2 and the peripheral throttling elements 3 can be adjusted under the constraint of the formula (3), so that the optimal conditioning effect is achieved, and the highest measurement precision is obtained.

On the other hand, the conditioning and flowrate measurement device according to the embodiment comprises a measuring pipe 8 and a throttling component arranged in the measuring pipe 8. The central throttling element 2, the plurality of peripheral throttling elements 3 and the measuring pipe 8 are coaxially arranged. The measuring pipe 8 is cylindrical, and the inner wall of the measuring pipe 8 is provided with an annular protrusion 10, so that an annular fluid channel including an inlet contraction portion and a portion with uniform cross section is formed between the measuring pipe 8 and its adjacent peripheral throttling element 3. The annular fluid channel 1a is closest to the side wall of the measuring pipe 8, and the annular fluid channel 1b is closest to the axis of the measuring pipe 8. On the side wall of the measuring pipe 8, a high-pressure tapping hole 4 is provided close to the inlet end of the throttling component, and a low-pressure tapping hole 5 is provided close to the outlet end of the throttling component. One end of a high-pressure pressure tube is connected to the high-pressure tapping hole 4, and the other end of the high-pressure pressure tube is connected to a high-pressure port of a differential pressure transmitter 6; one end of the low-pressure pressure tube is connected to the low-pressure tapping hole 5 and the other end of the low-pressure pressure tube is connected to a low-pressure port of the differential pressure transmitter 6. The differential transmitter 6 is connected to a computer 7.

In the embodiment, both ends of the measuring pipe 8 are respectively provided with a connecting flange, and the measuring pipe can be connected with the pipeline to be measured through the connecting flanges.

Similarly, the area of the cross section of all annular fluid channels (including the annular fluid channel between the central throttling element 2 and its adjacent peripheral throttling element 3, the annular fluid channels between adjacent peripheral throttling elements 3 and the annular fluid channel between the measuring pipe 8 and its adjacent peripheral throttling element 3) within the conditioning and flowrate measurement device also satisfies the formula (3).

When in use, the conditioning and flowrate measurement device is connected in series with the pipeline to be measured. When the fluid flows from pipeline to be measured to the device, a higher pressure is generated at the inlet end of the throttling component due to the blocking effect of the throttling component, and the higher pressure is transmitted to the high-pressure port of the differential pressure transmitter through the high-pressure tapping hole arranged on the side wall of the measuring pipe and the pressure tube; due to the blocking effect of the throttling component, the fluid can only pass through the annular fluid channels, and the pressure thereof drops to the minimum in the portion with uniform cross section, a lower pressure is transmitted to the low-pressure port of the differential pressure transmitter through the low-pressure tapping hole arranged on the side wall of the measuring pipe and the pressure tube; and the differential pressure transmitter transmits the higher pressure signal and the lower pressure signal to the computer, and the computer calculates the corresponding flow according to the formulas (5) or (6).

The conditioning and flowrate measurement device can more conveniently and accurately perform conditioning and flowrate measurement. During use, the conditioning and flowrate measurement device is connected in series with the pipeline to be measured, installation of the throttling component in the pipeline to be measured is not needed, coaxiality of each annular fluid channel is ensured, and the measurement precision is improved.

Embodiment 10

Figure 23:
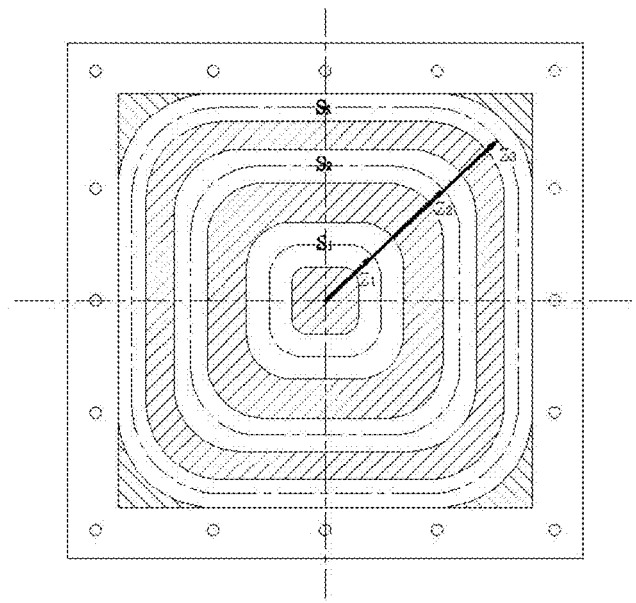
FIG. 23 shows a cross-sectional view of annular fluid channels of a conditioning and flowrate measurement device according to the tenth embodiment of the present disclosure.

FIG. 21 shows perspective view of a throttling component according to a tenth embodiment of the present disclosure; FIG. 22 shows a cross-sectional view of the throttling component according to a tenth embodiment of the present disclosure; and FIG. 23 shows cross-sectional views of the throttling component and annular fluid channels of a conditioning and flowrate measurement device according to the tenth embodiment of the present disclosure.

The tenth embodiment differs from the ninth embodiment in that shapes of the measuring pipe, the central throttling element and the peripheral throttling elements are different; in addition, in order to ensure smooth flow of the fluid, the central throttling element and the peripheral throttling elements are subjected to rounded corner treatment respectively, so that the cross section of the annular fluid channel is in a shape of two concentric rectangles with round corners.

In the present embodiment, the central throttling element is in a column shape, the peripheral throttling element is in a tube shape; in each cross section perpendicular to the axial direction of the central throttling element, the cross section of the central throttling element is a rounded rectangle, the cross section of the peripheral throttling element is in a shape of two concentric rectangles with rounded corners; along the axial direction of the central throttling element, the central throttling element comprises a first inlet contraction portion and a first uniform size portion which are connected with each other, and the peripheral throttling element comprises a second inlet contraction portion and a second uniform size portion which are connected with each other. In the present embodiment, the area of the cross section of the annular fluid channel formed by the measuring pipe, the peripheral throttling elements and the central throttling element satisfies the formula (4), wherein the cross section is perpendicular to the axial direction of the measuring pipe:

$$\frac{S_1 l_1 v_1}{z_1} = \frac{S_2 l_2 v_2}{z_2} = \cdots = \frac{S_i l_i v_i}{z_i} = \cdots = \frac{S_N l_N v_N}{z_N} \quad (4)$$

wherein, i=1, . . . , N, N is the number of annular fluid channels;
$S_i$ is the area of the cross section of portion with uniform cross section of the i-th annular fluid channel;
$l_i$ is the axial length of the i-th annular fluid channel;
$v_i$ is the flow velocity in the portion with uniform cross section in the i-th annular fluid channel;
$z_i$ is half of the diagonal length of the central rectangle of portion with uniform cross section of the i-th annular fluid channel.

In addition, when the formula (4) is applied, the value of $Z_i$ can be adjusted, and the value of $Z_i$ is determined according to FIG. 23, so that the calculation accuracy is improved.

Embodiment 11

Figure 24:
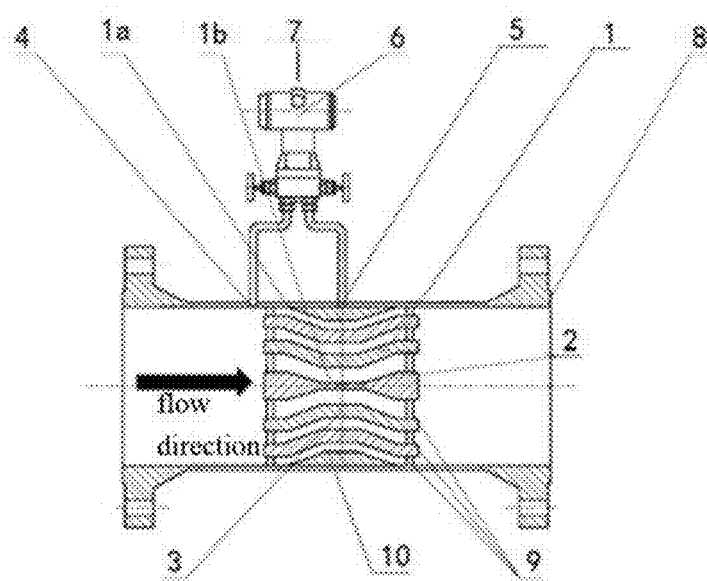
FIG. 24 shows a cross-sectional view of a throttling component and a conditioning and flowrate measurement device according to an eleventh embodiment of the present disclosure.
Figure 25:
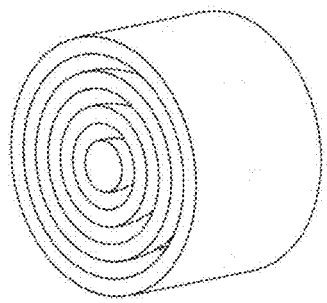
FIGS. 25 and 26 show perspective and cross-sectional views, respectively, of a throttling component according to the eleventh embodiment of the present disclosure.
Figure 26:
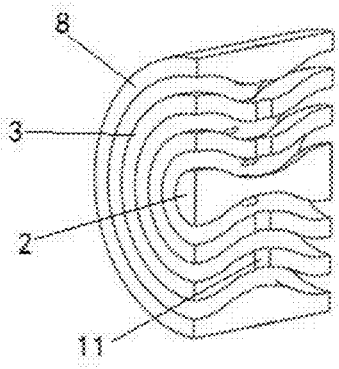

FIG. 24 shows a cross-sectional view of a throttling component and a conditioning and flowrate measurement device according to an eleventh embodiment of the present disclosure, FIG. 25 shows a perspective view of a throttling component according to the eleventh embodiment of the present disclosure, and FIG. 26 shows a cross-sectional view of a throttling component according to the eleventh embodiment of the present disclosure.

As shown in the figures above, the throttling component according to the eleventh embodiment of the present disclosure comprises a central throttling element 2 and a plurality of peripheral throttling elements 3, wherein the plurality of peripheral throttling elements 3 are sequentially sleeved outside the central throttling element 2; annular fluid channels 1 are respectively formed between the central throttling element and its adjacent peripheral throttling element, and between adjacent peripheral throttling elements. Along the axial direction of the central throttling element 2, the annular fluid channel 1 sequentially comprises an inlet contraction portion, a portion with uniform cross section and an outlet expansion portion.

The central throttle member 2 is in a shape of hourglass and has a middle part in a round column shape of uniform diameter. The peripheral throttling elements 3 is cylindrical, the diameter of the middle part thereof is reduced to form a cylindrical middle part of uniform diameter, and the side wall of the peripheral throttling element 3 has a certain thickness. Each annular fluid channel 1 is internally provided with a supporting and connecting member 9, and the supporting and connecting member 9 plays a fixing and supporting effect on the central throttling element 2 and the peripheral throttling elements 3. A plurality of circular through holes 11 (see FIG. 26) are provided in the cylindrical middle part of each peripheral throttling element 3, and the circular through holes 11 are uniformly distributed along the circumferential direction of the peripheral throttling element 3. The through holes 11 can communicate adjacent annular fluid channels, so that the pressure in each annular fluid channel 1 is basically equal. In this case, the average pressure in each annular fluid channel can be obtained by a low-pressure tapping hole provided on the side wall close to the portion with uniform cross section of the annular fluid channel, so that a stable pressure signal can be obtained. The through holes 11 are preferably provided on the axially central plane of the cylindrical middle part of the peripheral throttling element.

In the present embodiment, the axial lengths of the central throttle element 2 and the plurality of peripheral throttling elements 3 are equal, and the axial end surfaces of the central throttle element 2 and the plurality of peripheral throttling elements 3 are aligned with each other. The area of the cross section of the annular fluid channel satisfies formula (3), wherein the cross section is perpendicular to the axial direction of the central throttling element:

$$\frac{S_1 l_1 v_1}{r_1} = \frac{S_2 l_2 v_2}{r_2} = \cdots = \frac{S_i l_i v_i}{r_i} = \cdots = \frac{S_N l_N v_N}{r_N} \quad (3)$$

wherein, i=1, . . . , N, N is the number of annular fluid channels;
$S_i$ is the area of the cross section of the portion with uniform cross section of the i-th annular fluid channel;
$l_i$ is the axial length of the i-th annular fluid channel;
$v_i$ is the flow velocity in the portion with uniform cross section in the i-th annular fluid channel;
$r_i$ is the radius of the central circle of the portion with uniform cross section of the i-th annular fluid channel.

When in use, the throttling component can be arranged in the pipeline to be measured. According to the shape of the throttling component, the pipeline to be measured can be cylindrical or square tubular, and the central throttling element, the plurality of peripheral throttling elements and the pipeline to be measured are coaxially arranged; an annular fluid channel which comprises an inlet contraction portion, a portion with uniform cross section and an outlet expansion portion is also formed between the pipeline to be measured and its adjacent peripheral throttling element; in the side wall of the pipeline to be measured, a high-pressure tapping hole is formed close to the inlet port of the throttling component, and a low-pressure tapping hole is formed close to the portion with uniform cross section of the annular fluid channel.

The annular fluid channel sequentially comprises an inlet contraction portion, a portion with uniform cross section and an outlet expansion portion. In the inlet contraction portion, the cross sectional area of the annular fluid channel is gradually reduced along the axial direction of the central throttling element (i.e., the fluid flow direction after the throttling component is installed in the pipeline to be measured); and the cross sectional area of the annular fluid channel is kept constant in the portion with uniform cross section, and in the outlet expansion portion, the cross sectional area of the annular fluid channel gradually increases along the axial direction of the central throttling element. When the fluid flows through the throttling component, the pressure reaches the maximum in front of the inlet contraction portion, reduces to the lowest in the portion with uniform cross section, and is restored in the outlet expansion portion, so that a pressure drop can be formed to generate a differential pressure signal which can be used for flowrate measurement. During measurement, a high-pressure tapping hole 4 is provided close to the inlet end of the throttling component on the side wall of the pipeline to be measured, a low-pressure tapping hole 5 is provided on the side wall close to the portion with uniform cross section (the low-pressure tapping hole is preferably provided at the axially central plane of the portion with uniform cross-section), pressure is taken through the high-pressure tapping hole 4 and the low-pressure tapping hole 5, and the pressure difference is measured by a pressure sensor or a differential pressure sensor, so that the flow of the pipeline to be measured can be calculated. Due to the fact that the conditioning effect of the throttling component is good, a stable differential pressure signal with high signal-to-noise ratio can be obtained, so that the accuracy and reliability of flowrate measurement are improved.

In the other aspect, in the present embodiment, the conditioning and flowrate measurement device comprises a measuring pipe 8 and the throttling component arranged in the measuring pipe 8. The measuring pipe 8 is cylindrical, the inner wall of the measuring pipe 8 is provided with an annular protrusion 10, and the axial cross section of the annular protrusion 10 is trapezoidal. The central throttling element 2, the plurality of peripheral throttling elements 3 and the measuring pipe 8 are coaxially arranged, and annular fluid channels 1 are formed between the central throttling element and its adjacent peripheral throttling element, between the adjacent peripheral throttling elements, and between the measuring pipe and its adjacent peripheral throttling element, wherein the annular fluid channel 1a is closest to the side wall of the measuring pipe 8, and the annular fluid channel 1b is closest to the axis of the measuring pipe 8.

The area of the cross section of all the annular fluid channels (including the annular fluid channel between the central throttle element 2 and its adjacent peripheral throttling element 3, the annular fluid channels between the adjacent peripheral throttling elements 3, and the annular fluid channel between the measuring pipe 8 and its adjacent peripheral throttling element 3) satisfies the formula (3).

When in use, the conditioning and flowrate measurement device is connected in series with the pipeline to be measured, and when the fluid flows from the pipeline to be measured to the device, due to the blocking effect of the throttling component, a higher pressure is generated at the inlet end of the throttling component, and the high pressure is transmitted to the high pressure port of the differential pressure transmitter through the high-pressure tapping hole 4 provided on the side wall of the measuring pipe and the pressure pipe; due to the blocking effect of the throttling component, the fluid can only pass from the annular fluid channels, the pressure drops to the lowest in the portion with uniform cross section, and the low pressure is transmitted to the low pressure port of the differential pressure transmitter 6 through the low-pressure tapping hole 5 provided on the side wall of the measuring pipe and the pressure pipe; and the differential pressure transmitter transmits the high pressure signal and the low pressure signal to the computer 7, and the computer 7 calculates the corresponding flow according to the formulas (5) or (6).

Embodiment 12

Figure 27:
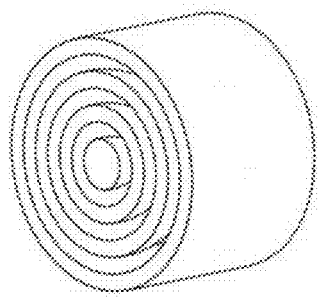
FIGS. 27 and 28 show perspective and cross-sectional views, respectively, of a throttling component according to a twelfth embodiment of the present disclosure.
Figure 28:
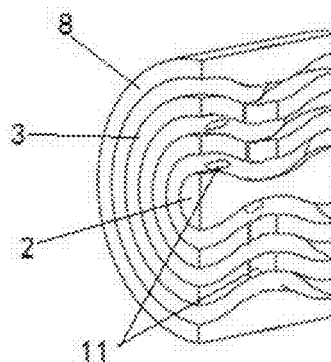

FIG. 27 shows a perspective view of a throttling component according to a twelfth embodiment of the present disclosure, and FIG. 28 shows a cross-sectional view of a throttling component according to the twelfth embodiment of the present disclosure. The twelfth embodiment differs from the eleventh embodiment in that a plurality of elliptical through holes 11 are formed in the cylindrical middle part of each peripheral throttling element 3, and the elliptical through holes 11 are uniformly distributed along the circumferential direction of the peripheral throttling element 3.

Embodiment 13

FIG. 29 shows a cross-sectional view of a conditioning and flowrate measurement device according to a thirteenth embodiment of the present disclosure, and FIGS. 30 and 31 show perspective and cross-sectional views, respectively, of the throttling component according to the thirteenth embodiment of the present disclosure.

As shown in the figures above, the conditioning and flowrate measurement device according to the thirteenth embodiment of the present disclosure comprises a measuring pipe 8 and a throttling component arranged in the measuring pipe 8. The throttling component comprises a central throttling element 2 and a plurality of peripheral throttling elements 3. The central throttling element 2 is in a spindle shape and has a middle part in a round column shape with uniform diameter. The peripheral throttling element 3 is cylindrical, the axial cross section of the side wall of the peripheral throttling element 3 is in a spindle shape, the peripheral throttling element 3 has a cylindrical middle part of uniform diameter, and the side wall of the peripheral throttling element 3 has a certain thickness. The measuring pipe 8 is cylindrical. The plurality of peripheral throttling elements 3 are sequentially sleeved outside the central throttling element 2, the central throttling element 2, the plurality of peripheral throttling elements 3 and the measuring pipe 8 are coaxially arranged, annular fluid channels 1 are respectively formed between the central throttling element and its adjacent peripheral throttling element, between adjacent peripheral throttling elements, and between the measuring pipe and its adjacent peripheral throttling element, wherein the annular fluid channel 1a is closest to the side wall of the measuring pipe 8, and the annular fluid channel 1b is closest to the axis of the measuring pipe 8. Along the axial direction of the central throttling element 2, the annular fluid channel 1 sequentially comprises an inlet contraction portion, a portion with uniform cross section and an outlet expansion portion. Taking the annular fluid channel 1a as an example, its inlet contraction portion is formed by the head of a spindle-shaped central throttling element and the head of the peripheral throttling element with a spindle-shaped axial cross section; the portion with uniform cross section is formed by the middle part in a round column shape of uniform diameter of the central throttling element and the cylindrical middle part with uniform diameter of the peripheral throttling element; and the outlet expansion portion is formed by the tail part of the central throttling element and the tail part of the peripheral throttling element. Each annular fluid channel 1 is internally provided with a supporting and connecting member 9, and the supporting and connecting member 9 plays a fixing and supporting effect on the central throttling element 2 and the peripheral supporting elements 3.

A plurality of circular through holes (see FIGS. 30 and 31) are arranged in the cylindrical middle part of each peripheral throttling element 3, and the circular through holes are uniformly distributed along the circumferential direction of the peripheral throttling element 3.

A high-pressure tapping hole 4 is formed in the side wall of the measuring pipe 8 close to the inlet port of the throttling component, and a low-pressure tapping hole 5 is formed at the middle position of the portion with uniform cross section of the annular fluid channel in the side wall of the measuring pipe 8. One end of the high-pressure pressure tube is connected to the high-pressure tapping hole 4, and the other end is connected to the high-pressure port of the differential pressure transmitter 6. One end of the low-pressure pressure tube is connected to the low-pressure tapping hole 5, and the other end is connected to the low-pressure port of the differential pressure transmitter 6. The differential transmitter 6 is connected to the computer 7.

The use method and the principle of the conditioning and flowrate measurement device according to the thirteenth embodiment are the same as the eleventh embodiment, and are not repeated herein.

Embodiment 14

FIGS. 32 and 33 show perspective and cross-sectional views, respectively, of a throttling component according to a fourteenth embodiment of the present disclosure. The fourteenth embodiment differs from the thirteenth embodiment in that a plurality of elliptical through holes are formed in the cylindrical middle part of each peripheral throttling element 3, and the elliptical through holes are uniformly distributed along the circumferential direction of the peripheral throttling element 3.

Embodiment 15

Figures 34, 35:
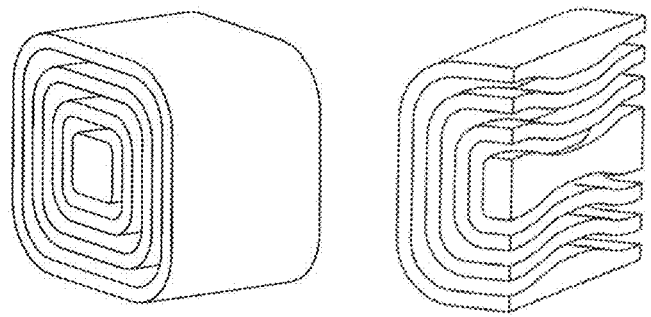
FIGS. 34 and 35 show perspective and cross-sectional views, respectively, of a throttling component according to a fifteenth embodiment of the present disclosure.
Figure 36:
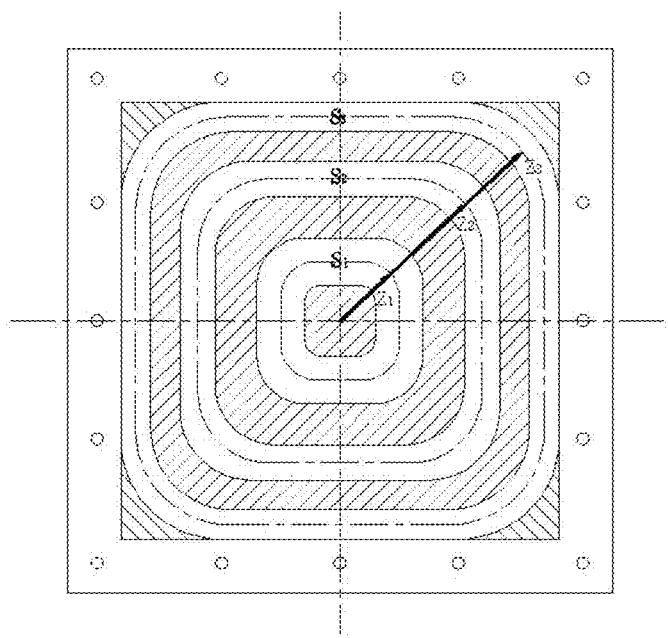
FIG. 36 shows a cross-sectional view of a portion with uniform cross section of annular fluid channels of a conditioning and flowrate measurement device according to a sixteenth embodiment of the present disclosure.

FIGS. 34 and 35 show perspective and cross-sectional views, respectively, of a throttling component according to a fifteenth embodiment of the present disclosure, and FIG. 36 shows a cross-sectional view of a portion with uniform cross section of annular fluid channels of a conditioning and flowrate measurement device according to the fifteenth embodiment of the present disclosure.

The fifteenth embodiment differs from the eleventh embodiment in that the shapes of the measuring pipe, the central throttling element and the peripheral throttling elements are different, and in order to ensure smooth flow of the fluid, the central throttling element and the peripheral throttling elements are subjected to rounded corner treatment respectively, so that the cross section of the annular fluid channel is in the shape of two rectangles with rounded corners.

In the present embodiment, the central throttling element is in a column shape, and the peripheral throttling element is in a tube shape; on each cross section perpendicular to the axial direction of the central throttling element, the cross section of the central throttling element is a rounded rectangle, and the cross section of the peripheral throttling element is in the shape of two rectangles with rounded corners. Along the axial direction of the central throttling element, the central throttling element sequentially comprises a first inlet contraction portion, a first uniform size portion and a first outlet expansion portion; and the peripheral throttling element sequentially comprises a second inlet contraction portion, a second uniform size portion and a second outlet expansion portion. In the present embodiment, the area of the cross section of the annular fluid channel formed by the measuring pipe, the peripheral throttling elements and the central throttling element satisfies the formula (4) above. In this case, when the formula (4) is applied, the value of $Z_i$ can be determined as shown in FIG. 36 to improve the calculation accuracy.

The above description has described embodiments of the disclosure, which are exemplary and not exhaustive, and are not intended to be limited to the embodiments disclosed. Many modifications and variations will be apparent to those skilled in the art without departing from the scope and spirit of the illustrated embodiments.

What is claimed is:

1. A throttling component, comprising a central throttling element and a plurality of peripheral throttling elements, the plurality of peripheral throttling elements are sequentially sleeved outside the central throttling element and are coaxial with the central throttling element; annular fluid channels are respectively formed between the central throttling element and its adjacent peripheral throttling element, and between adjacent peripheral throttling elements;

wherein, each annular fluid channel sequentially comprises an inlet contraction portion, a portion with uniform cross section and an outlet expansion portion along an axial direction of the central throttling element;

the central throttling element is in a shape of an hourglass and has a middle part in a round column shape of uniform diameter, each peripheral throttling element is cylindrical and a diameter of a middle part of each peripheral throttling element is reduced to form a cylindrical middle part of uniform diameter; an axial length of the middle part in a round column shape of the central throttling element is equal to an axial length of the cylindrical middle part of each peripheral throttling element.

2. The throttling component according to claim 1, wherein an area of a cross section of each annular fluid channel satisfies the following formula (1), wherein the cross section is perpendicular to an axial direction of the central throttling element:

$$\frac{S_1 l_1 v_1}{r_1} = \frac{S_2 l_2 v_2}{r_2} = \cdots = \frac{S_i l_i v_i}{r_i} = \cdots = \frac{S_N l_N v_N}{r_N} \quad (1)$$

wherein, i=1, . . . , N, N is the number of annular fluid channels;

$S_i$ is the area of the cross section of the i-th annular fluid channel;

$l_i$ is the axial length of the i-th annular fluid channel;

$v_i$ is the flow velocity in the i-th annular fluid channel;

$r_i$ is the radius of the central circle of the i-th annular fluid channel.

3. The throttling component according to claim 1, wherein axial lengths of the central throttling element and the plurality of peripheral throttling elements are equal, and axial end surfaces of the central throttling element and the plurality of peripheral throttling elements are aligned with each other.

4. The throttling component according to claim 1, wherein at least one through hole is formed in the cylindrical middle part of each peripheral throttling element.

5. A conditioning and flowrate measurement device, comprising:

a measuring pipe; and the throttling component according to claim 1, wherein the throttling component is arranged in the measuring pipe.

6. The conditioning and flowrate measurement device according to claim 5, wherein the central throttling element, the plurality of peripheral throttling elements and the measuring pipe are coaxially arranged, and an annular fluid channel is formed between the measuring pipe and its adjacent peripheral throttling element;

wherein on a side wall of the measuring pipe, a high-pressure tapping hole is formed close to an inlet port of the throttling component, and a low-pressure tapping hole is formed close to an outlet port of the throttling component.

7. The conditioning and flowrate measurement device according to claim 5, wherein the central throttling element, the plurality of peripheral throttling elements and the measuring pipe are coaxially arranged; an annular protrusion is arranged on an inner wall of the measuring pipe, so that an annular fluid channel comprising an inlet contraction portion, an uniform cross section portion, and an outlet expansion portion is formed between the measuring pipe and its adjacent peripheral throttling element;

wherein on a side wall of the measuring pipe, a high-pressure tapping hole is formed close to an inlet port of the throttling component, and a low-pressure tapping hole is formed close to the uniform cross section portion of the annular fluid channel between the measuring pipe and its adjacent peripheral throttling element.

* * * * *